United States Patent
Hwang et al.

(10) Patent No.: US 9,946,377 B2
(45) Date of Patent: Apr. 17, 2018

(54) STRUCTURED BODY WITH CONDUCTING AND LIGHT ABSORPTION LAYERS

(75) Inventors: Ji Young Hwang, Daejeon (KR); In-Seok Hwang, Daejeon (KR); Sang Ki Chun, Daejeon (KR); Seung Heon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 430 days.

(21) Appl. No.: 13/880,296

(22) PCT Filed: Oct. 19, 2011

(86) PCT No.: PCT/KR2011/007782
§ 371 (c)(1),
(2), (4) Date: Apr. 18, 2013

(87) PCT Pub. No.: WO2012/053818
PCT Pub. Date: Apr. 26, 2012

(65) Prior Publication Data
US 2013/0215067 A1 Aug. 22, 2013

(30) Foreign Application Priority Data
Oct. 19, 2010 (KR) .................. 10-2010-0102109

(51) Int. Cl.
| | | |
|---|---|---|
| *G02B 5/00* | (2006.01) | |
| *G06F 3/041* | (2006.01) | |
| *G02B 27/00* | (2006.01) | |
| *G02B 27/02* | (2006.01) | |
| *G06F 3/044* | (2006.01) | |

(52) U.S. Cl.
CPC .......... *G06F 3/0412* (2013.01); *G02B 5/003* (2013.01); *G02B 27/0018* (2013.01); *G02B 27/021* (2013.01); *G02B 27/022* (2013.01); *G06F 3/044* (2013.01)

(58) Field of Classification Search
CPC G02B 27/0018; G02B 27/021; G02B 27/022; G02B 5/003; G06F 3/0142; G06F 3/044
See application file for complete search history.

(56) References Cited

U.S. PATENT DOCUMENTS

| | | | | |
|---|---|---|---|---|
| 5,521,765 A | * | 5/1996 | Wolfe | 359/885 |
| 5,728,456 A | * | 3/1998 | Adair | B32B 17/06 |
| | | | | 359/359 |
| 5,852,513 A | * | 12/1998 | McDole et al. | 359/580 |
| 5,998,013 A | * | 12/1999 | Shoshi et al. | 428/331 |
| 2002/0160218 A1 | * | 10/2002 | Choi et al. | 428/610 |

(Continued)

FOREIGN PATENT DOCUMENTS

| | | |
|---|---|---|
| CN | 201107767 Y | 8/2008 |
| JP | 2006-251237 A | 9/2006 |

(Continued)

*Primary Examiner* — Jordan Schwartz
*Assistant Examiner* — George G King
(74) *Attorney, Agent, or Firm* — Dentons US LLP

(57) ABSTRACT

The present invention relates to a touch panel comprising a structure body comprising: a substrate; a conducting pattern that is provided on at least one surface of the substrate; and a light absorption pattern provided on at least one surface of the conducting pattern and provided on at least a portion of regions corresponding to the conducting pattern, and a method for manufacturing the same.

28 Claims, 15 Drawing Sheets

(56) References Cited

U.S. PATENT DOCUMENTS

| | | | |
|---|---|---|---|
| 2006/0046071 A1* | 3/2006 | Richter et al. ............... | 428/432 |
| 2006/0102461 A1* | 5/2006 | Cok et al. ..................... | 200/512 |
| 2006/0204730 A1 | 9/2006 | Nakamura et al. | |
| 2006/0234035 A1* | 10/2006 | Wang et al. .................. | 428/327 |
| 2007/0224412 A1* | 9/2007 | Hara ...................... | B32B 17/06 |
| | | | 428/336 |
| 2008/0182349 A1 | 7/2008 | Yamazaki et al. | |
| 2009/0058250 A1 | 3/2009 | Sin et al. | |
| 2009/0122017 A1 | 5/2009 | Emig et al. | |
| 2010/0013798 A1 | 1/2010 | Nakajima et al. | |
| 2010/0035034 A1* | 2/2010 | Yin ..................... | C23C 14/0676 |
| | | | 428/216 |
| 2012/0031746 A1 | 2/2012 | Hwang et al. | |

FOREIGN PATENT DOCUMENTS

| | | |
|---|---|---|
| JP | 2006-344163 A | 12/2006 |
| JP | 200847777 A | 2/2008 |
| JP | 2010-086684 A | 4/2010 |
| JP | 2010-147235 A | 7/2010 |
| KR | 10-2008-0011131 A | 1/2008 |
| KR | 10-2009-0023044 A | 3/2009 |
| KR | 10-2010-0011259 A | 2/2010 |
| KR | 100954898 B1 | 4/2010 |
| KR | 10-2010-0068298 A | 6/2010 |
| KR | 10 2010-0090669 A | 8/2010 |
| KR | 10-2010-0090669 A | 8/2010 |
| TW | 200824000 A | 6/2008 |
| WO | 2010/090487 A2 | 8/2010 |

\* cited by examiner

[Figure 1]
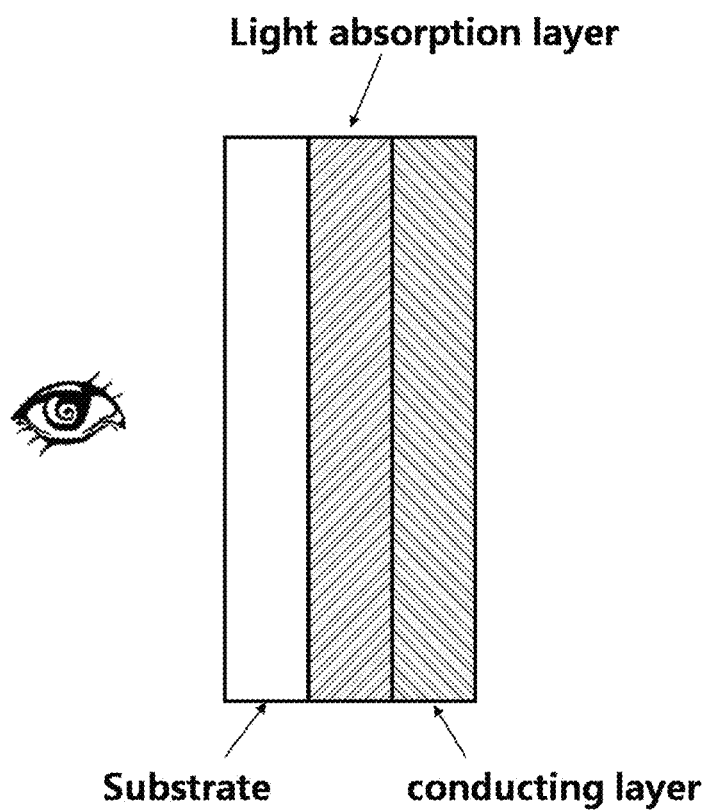

[Figure 2]
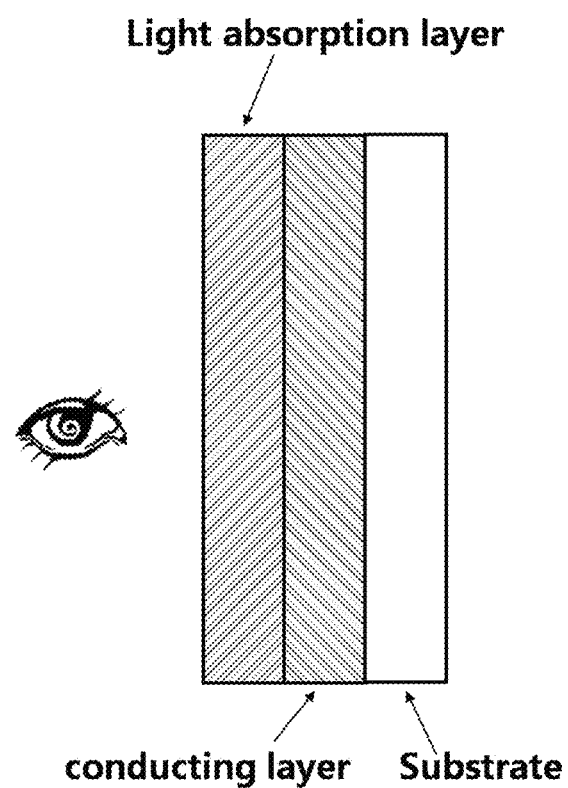

[Figure 3]
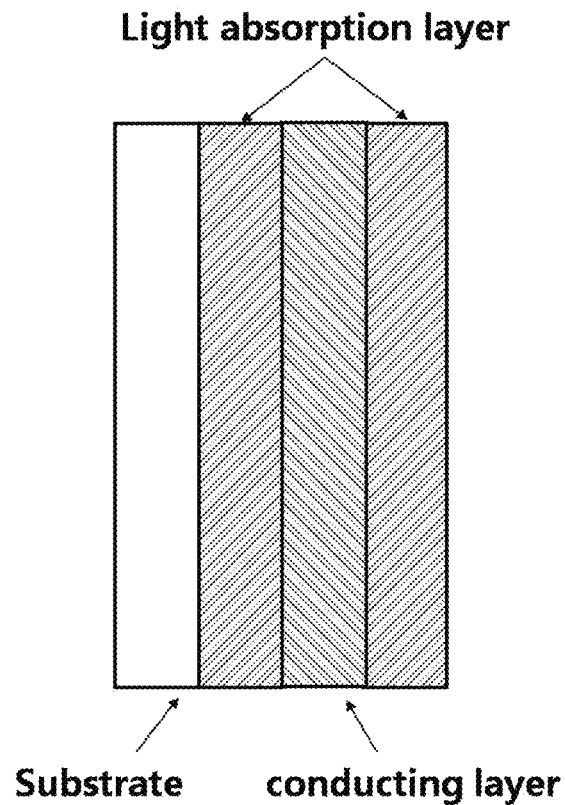
[Figure 4]
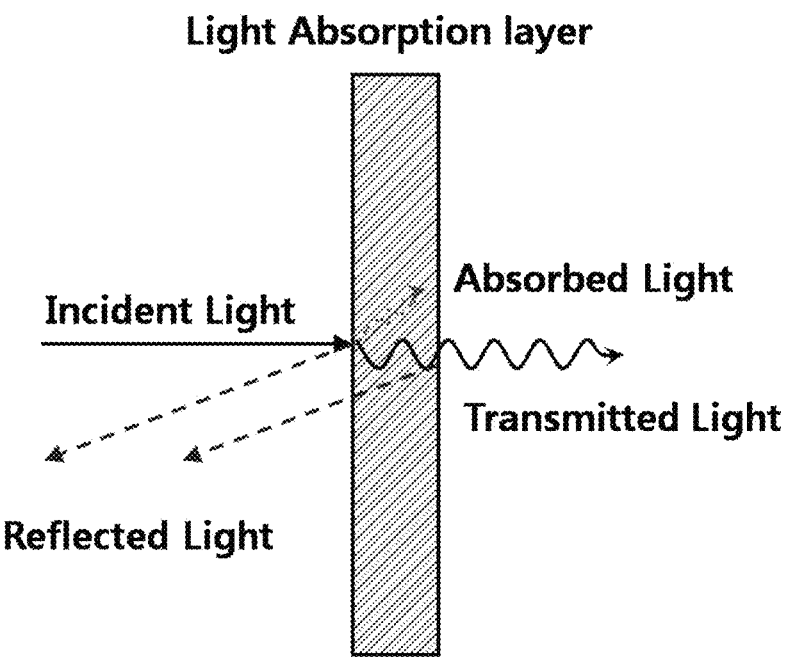

[Figure 5]
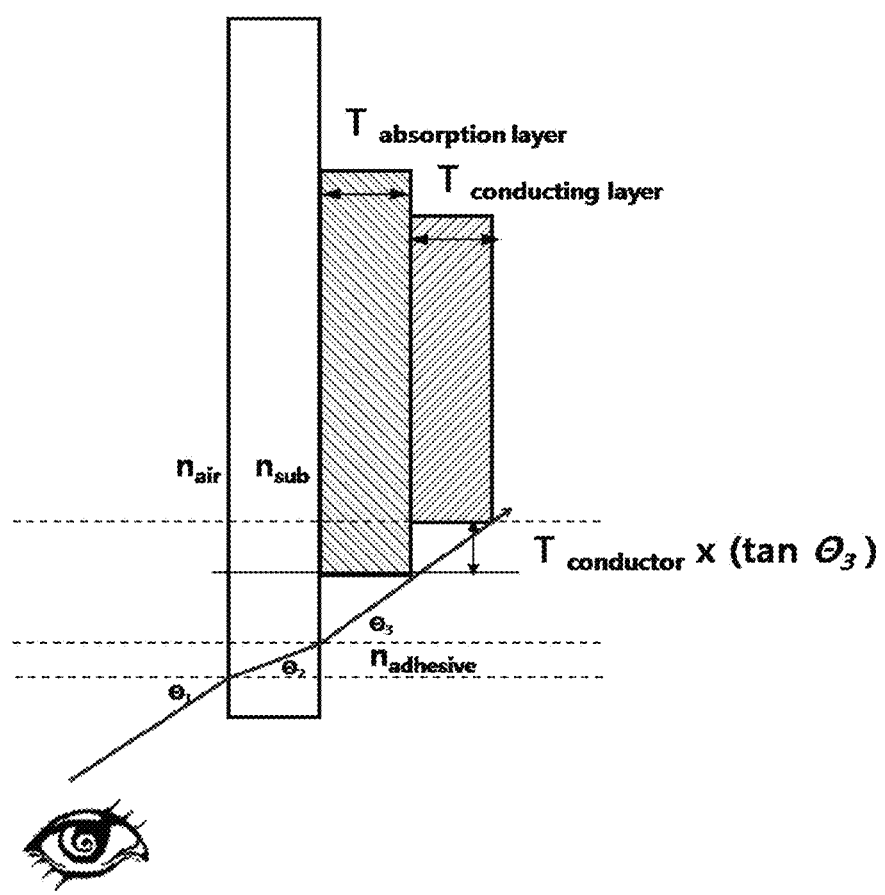

[Figure 6]
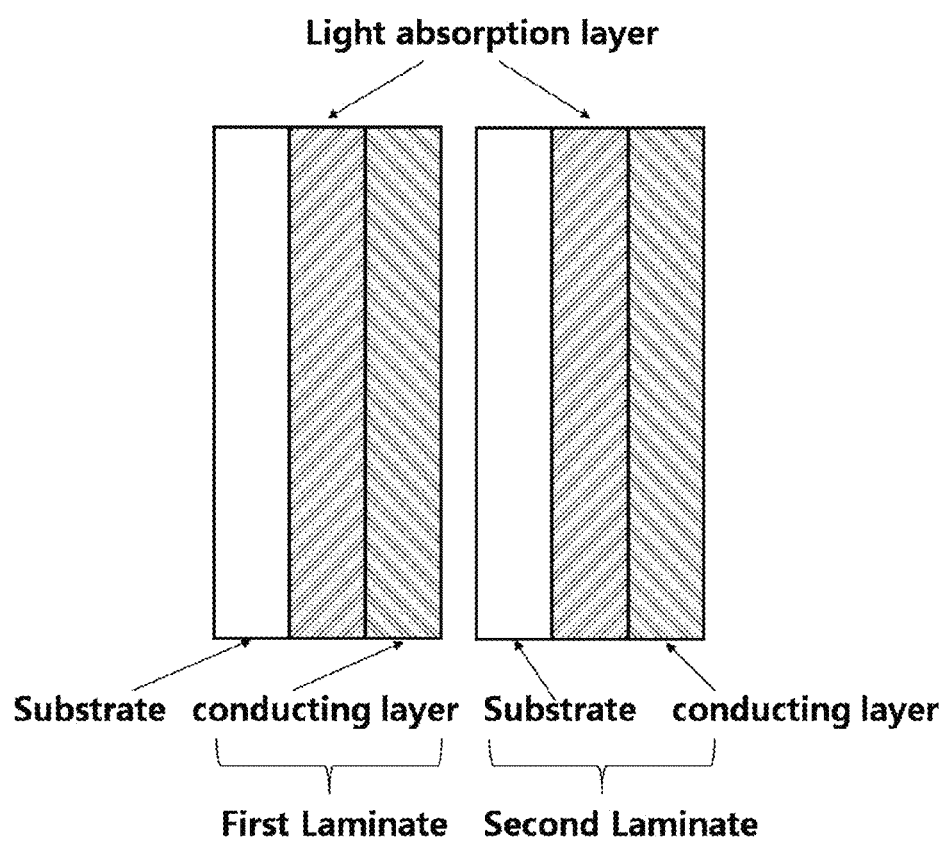

[Figure 7]
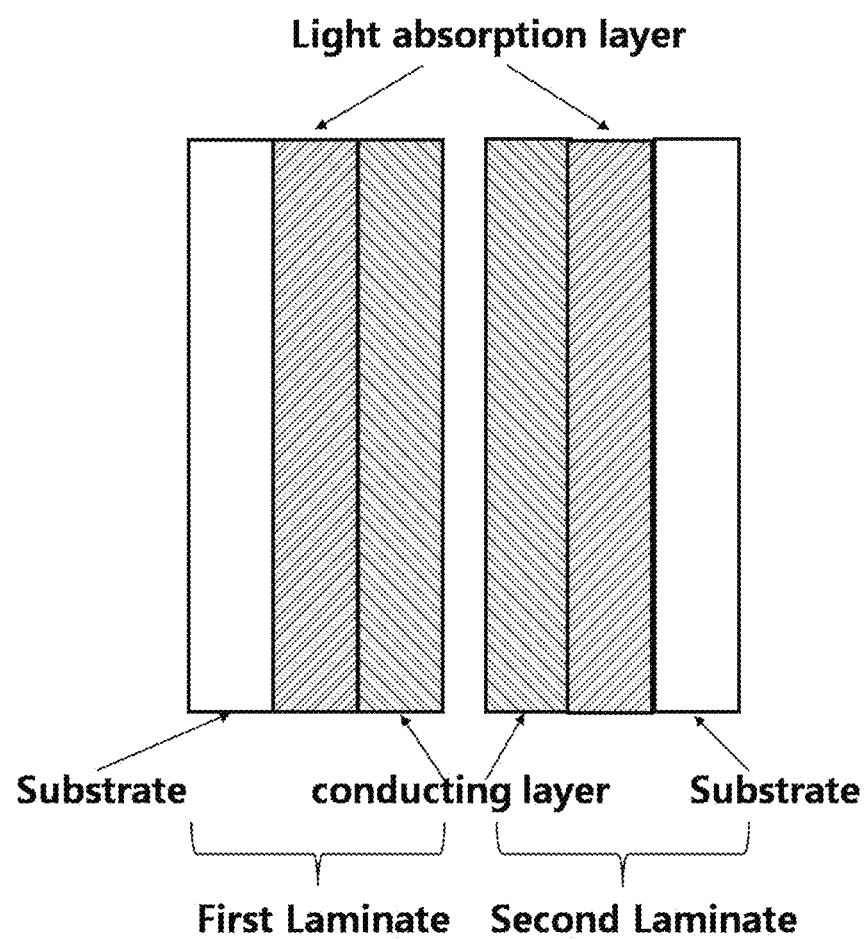

[Figure 8]
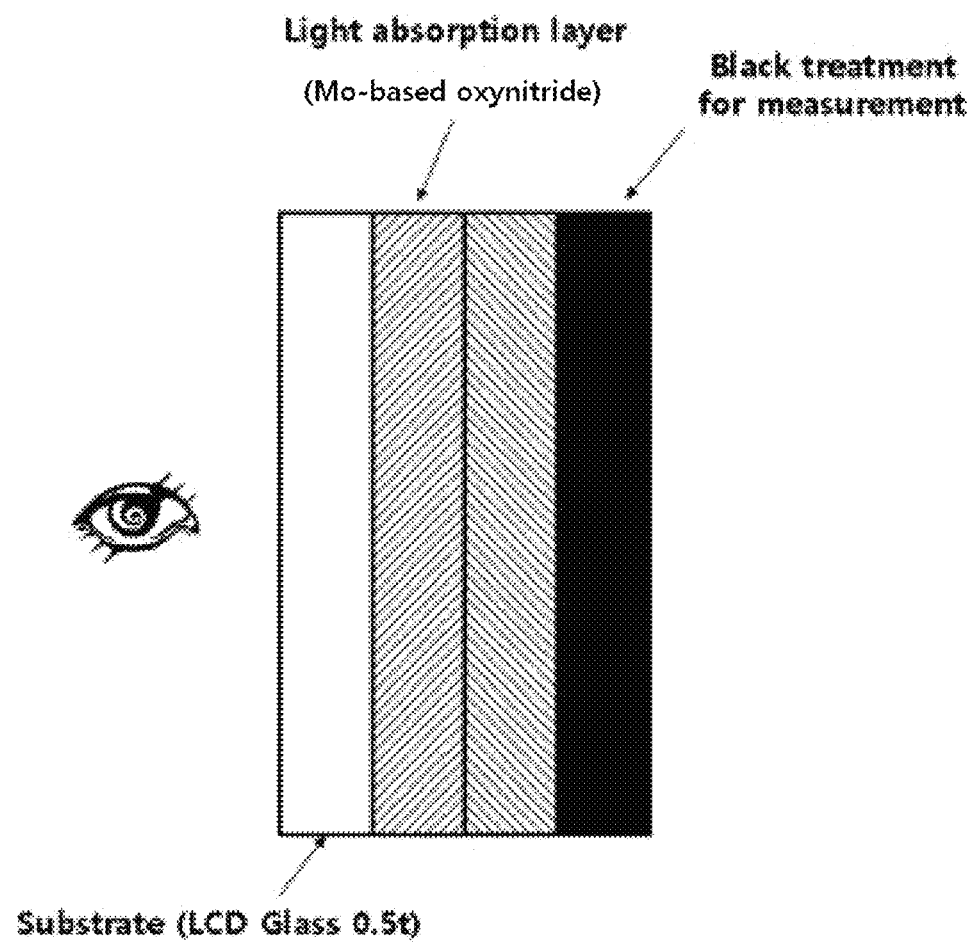

[Figure 9]
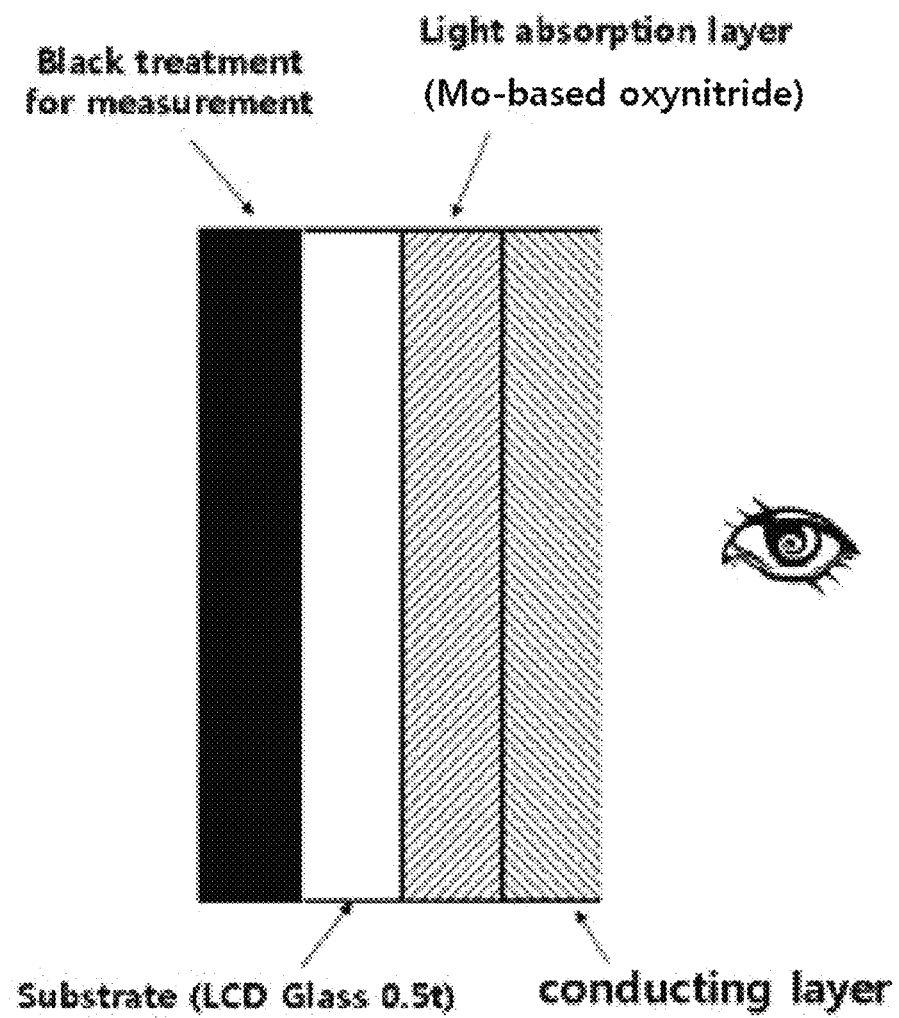

[Figure 10]
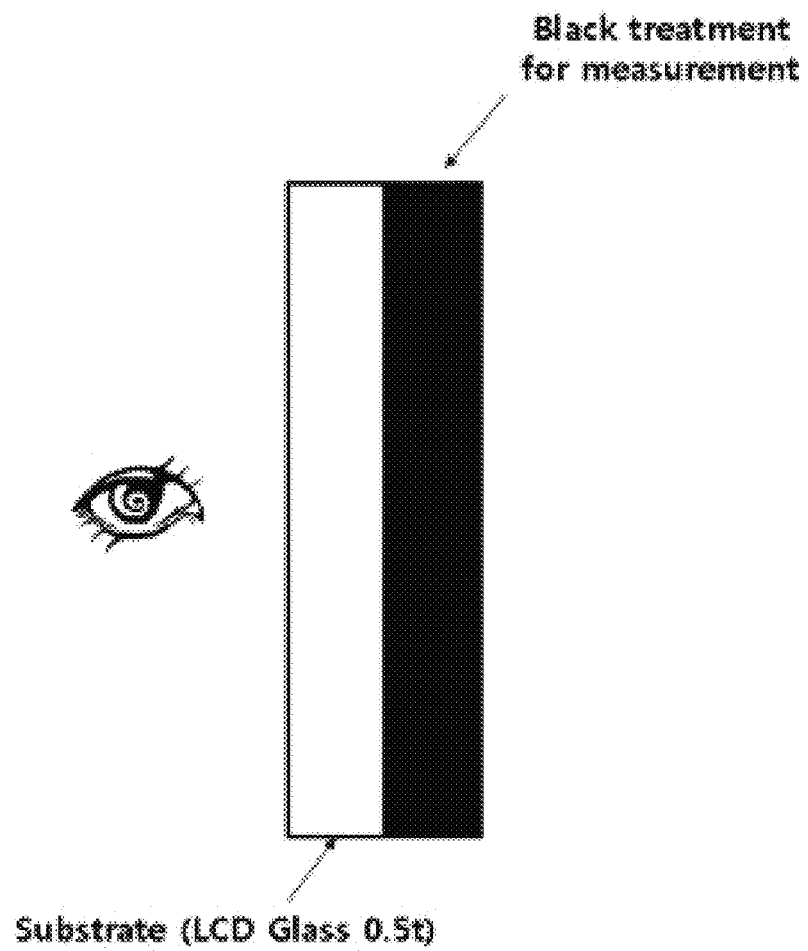

[Figure 11]
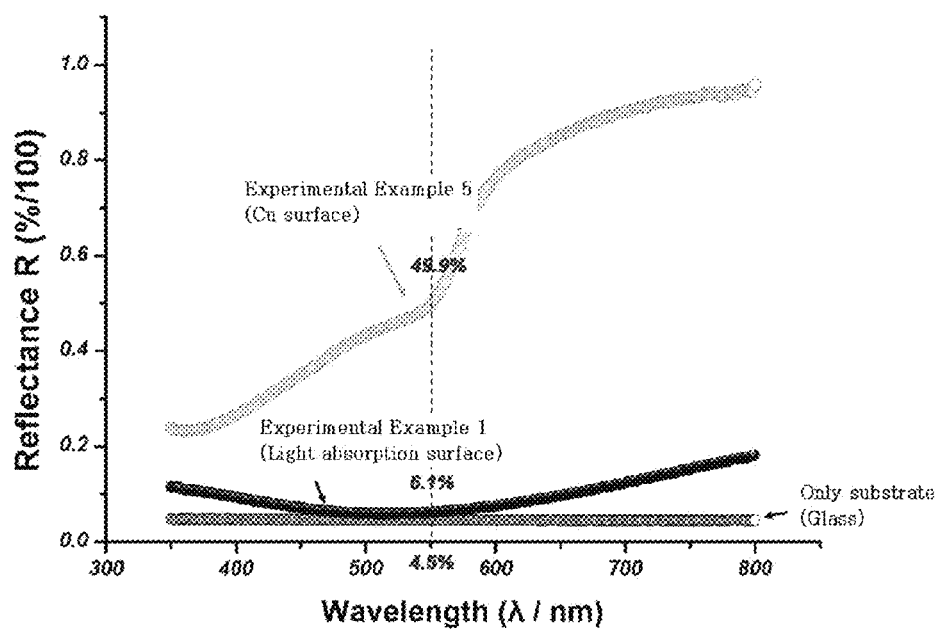

[Figure 12]
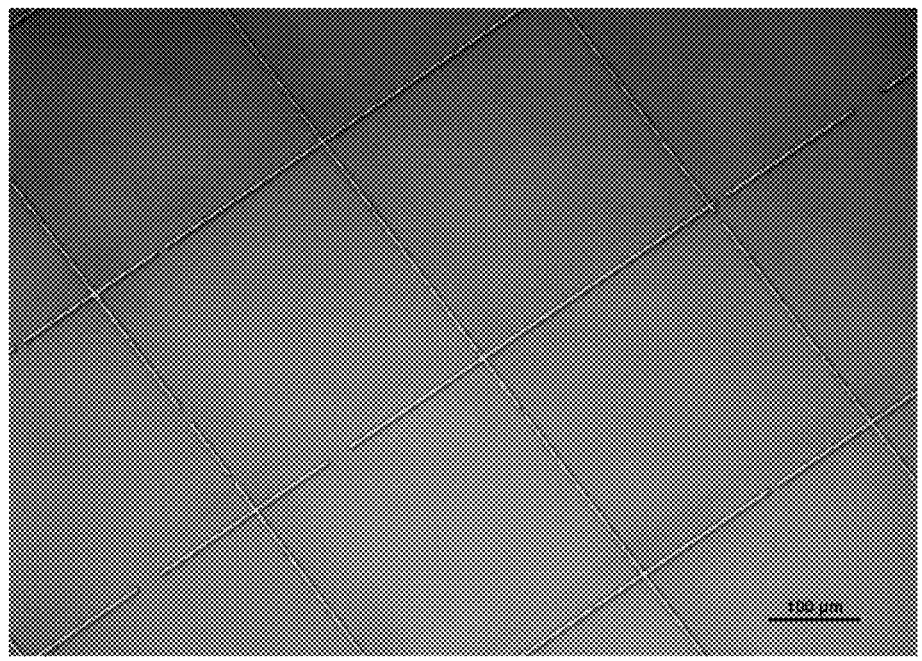
[Figure 13]
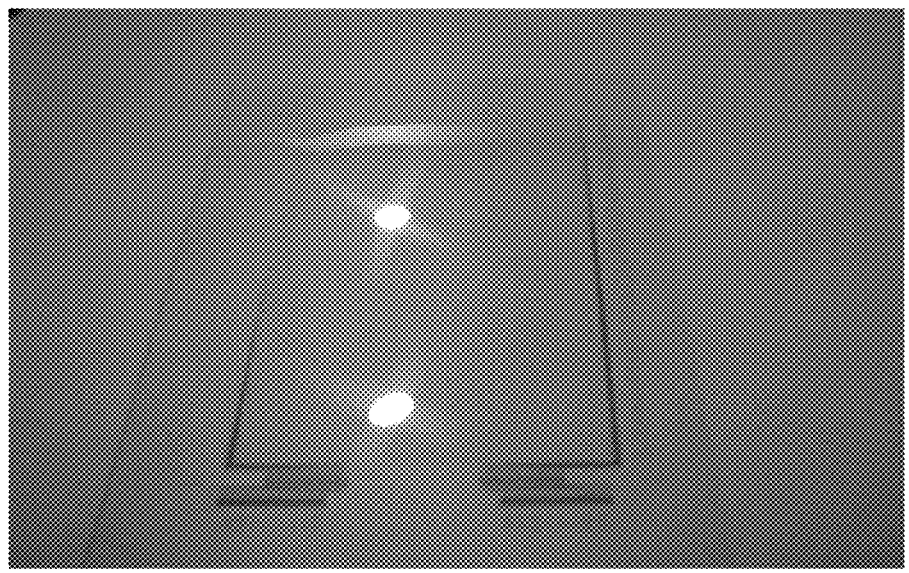

[Figure 14]
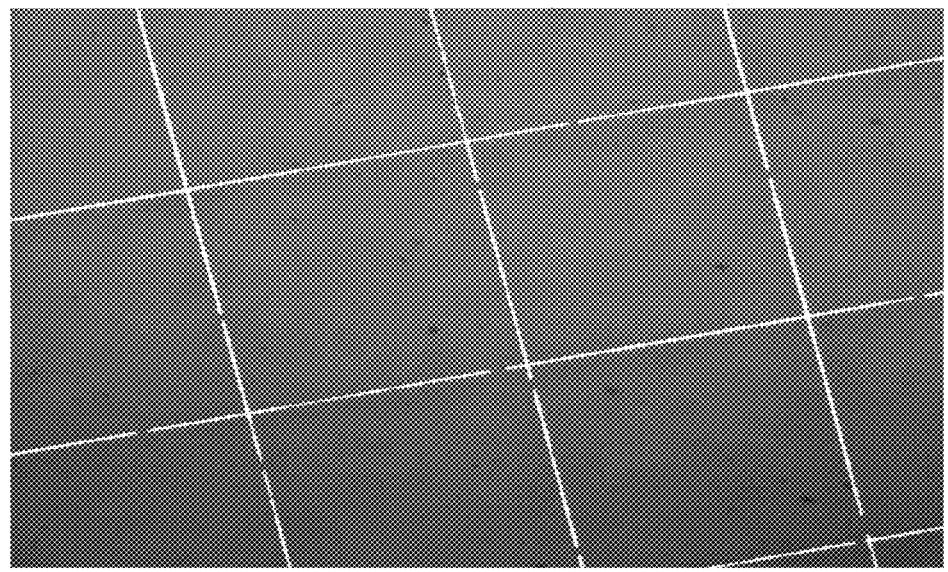
[Figure 15]
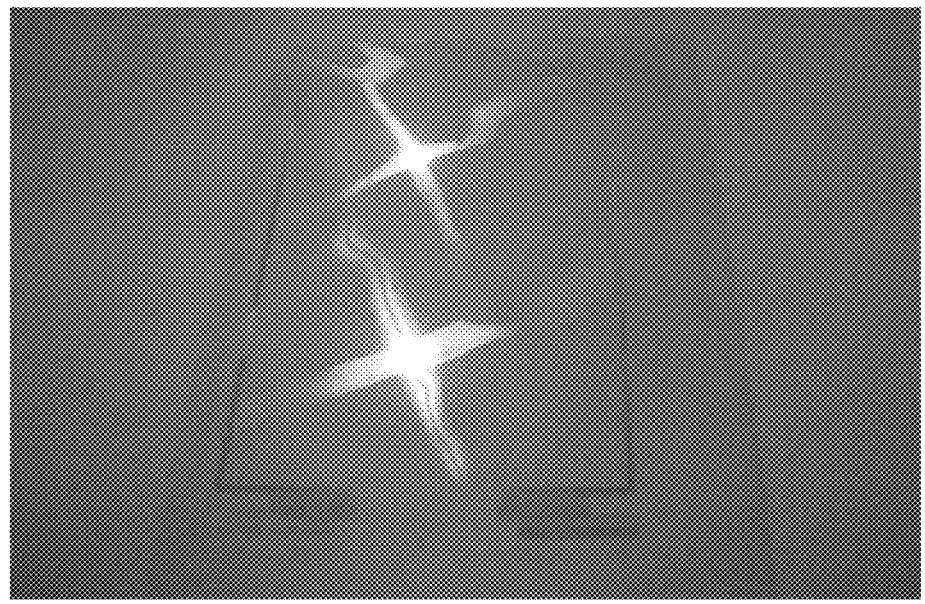

[Figure 16]
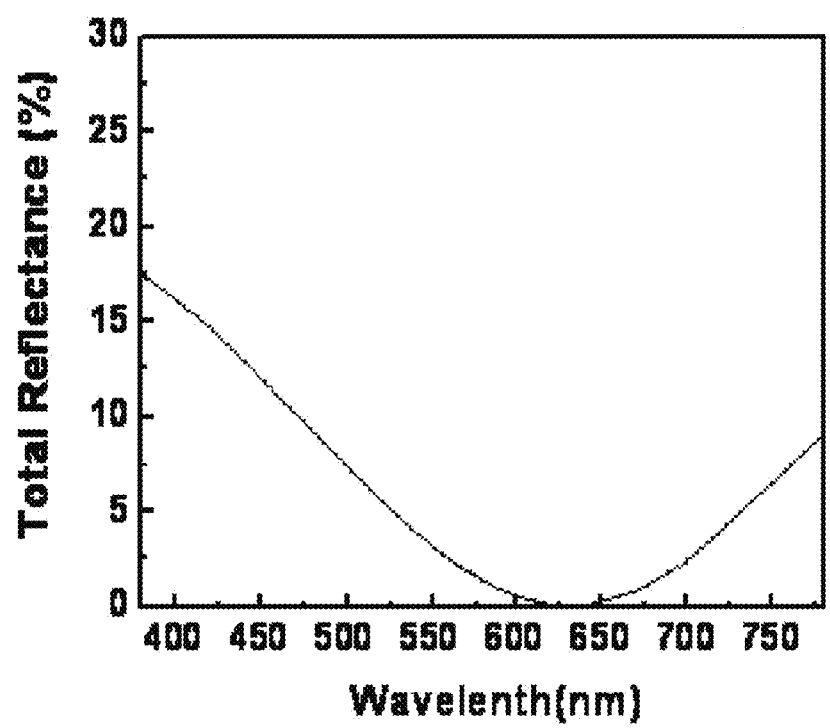

[Figure 17]
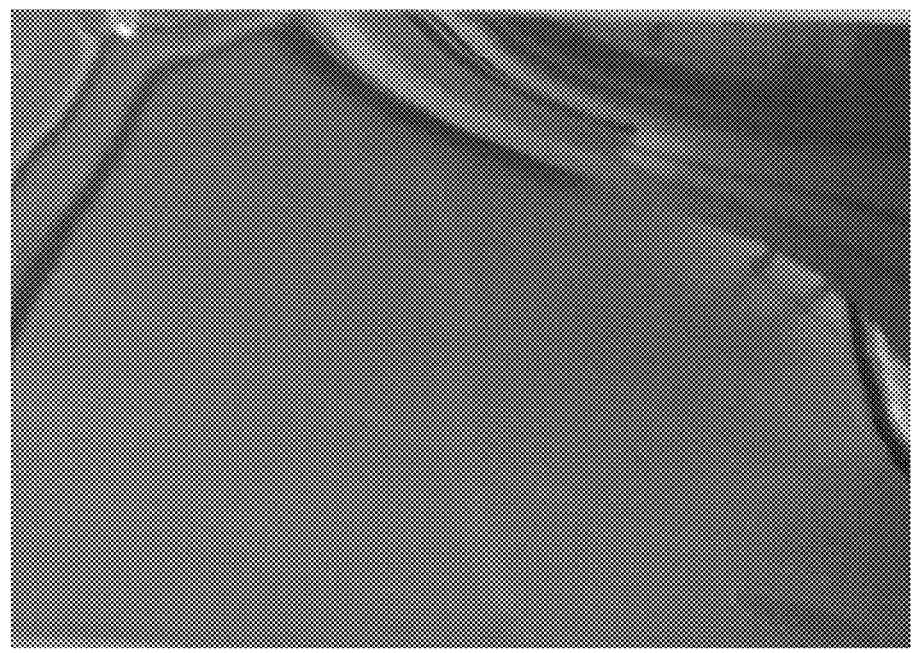
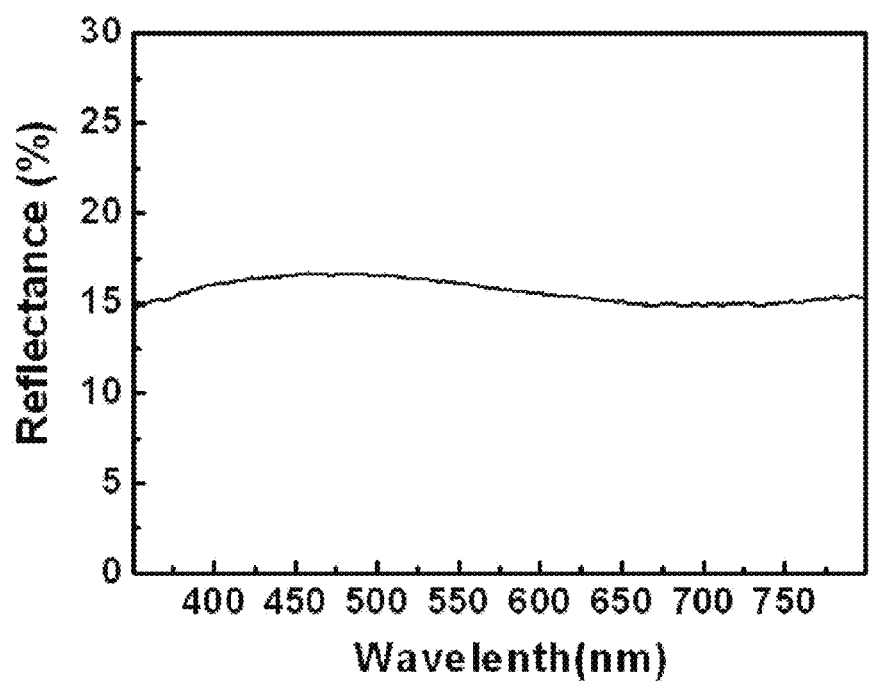

[Figure 18]
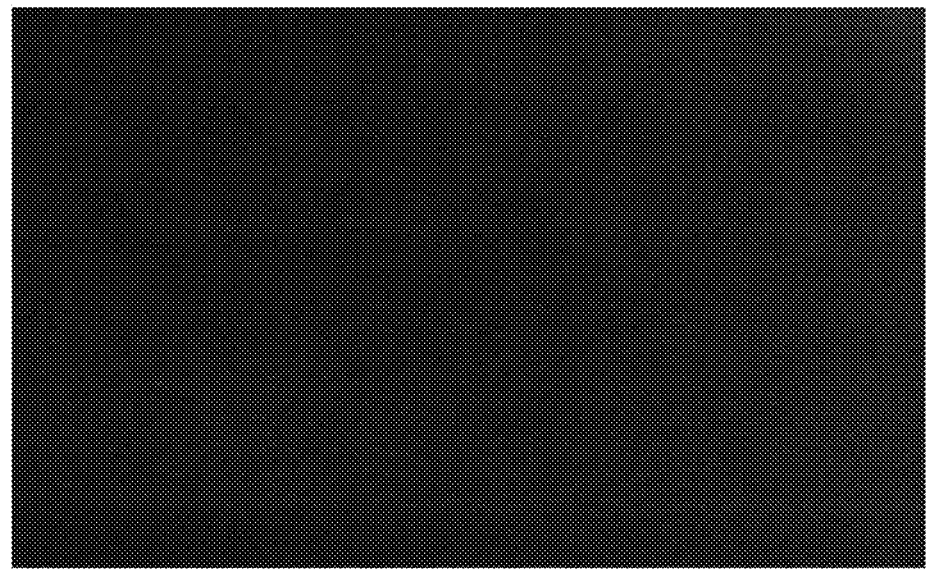
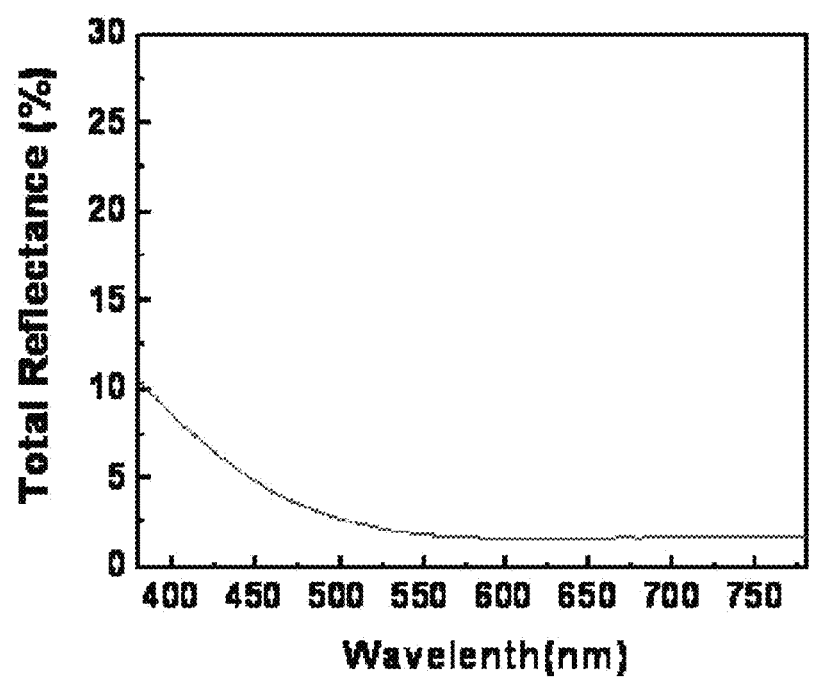

STRUCTURED BODY WITH CONDUCTING AND LIGHT ABSORPTION LAYERS

This application is a 35 U.S.C. § 371 National Stage Entry of International Application No. PCT/KR2011/007782, filed Oct. 19, 2011. which claims priority from Korean Patent Application No. 10-2010-0102109, filed on Oct. 19, 2010 in the KIPO, all of which are incorporated herein by reference in their entirety.

TECHNICAL FIELD

The present invention relates to a touch panel and a method for manufacturing the same. In detail, the present invention relates to a touch panel comprising a conducting pattern and a method for manufacturing the same. In more detail, the present invention relates to a touch panel in which a concealment property of a conducting pattern in constituting the touch panel by using the conducting pattern is improved, and a method for manufacturing the same.

BACKGROUND ART

In general, an electrostatic capacitance type touch panel uses an ITO-based conducting film, but the ITO has disadvantages in that, a realization speed is low by a RC delay of the ITO when applying the ITO to a large area touch panel, such that it is difficult to apply the ITO to the large area. In addition, in the case where a touch screen is manufactured by using a film on which the ITO is deposited, it is not easy to treat the touch screen due to cracks by bending of the ITO film. Among the disadvantages, in particular, in order to overcome a problem of enlargement by the RC delay, an effort for introducing an additional compensation chip has been made, but this has a problem in that a cost is increased. In order to overcome the problem, many companies are developing a technology for substituting an ITO conducting film by using a metal pattern. However, this technology has disadvantages in that in the case where a general single metal is used, because of high reflectance of the metal, a pattern is not realized well by a human eye in term of visibility and, with respect to external light, because of high reflectance and a haze value, glaring may occur.

DISCLOSURE

Technical Problem

The present invention has been made in an effort to improve visibility of a conducting pattern and a reflection property with respect to external light in a touch panel that comprises a conducting pattern provided in an effective picture portion, which is different from a known touch panel using an ITO-based conducting film.

Technical Solution

An exemplary embodiment of the present invention provides a structure body comprising: a substrate; a conducting layer provided on at least one surface of the substrate; and a light absorption layer provided on at least one surface of the conducting layer.

Another exemplary embodiment of the present invention provides a touch panel comprising a structure body, comprising: a substrate; a conducting pattern provided on at least one surface of the substrate; and a light absorption pattern provided on at least one surface of the conducting pattern and provided on at least a portion of regions corresponding to the conducting pattern.

Yet another exemplary embodiment of the present invention provides a display comprising the touch panel and a display module.

Still another exemplary embodiment of the present invention provides a structure body comprising: a transparent substrate; a conducting layer provided on at least one surface of the transparent substrate and comprising at least one of metal, an alloy of metals, metal oxide, metal nitride, and metal oxynitride; and a light absorption layer provided on at least one surface of the conducting layer, wherein the light absorption layer is provided between the conducting layer and the transparent substrate, and total reflectance measured in a side of the transparent substrate is 15% or less.

Still yet another exemplary embodiment of the present invention provides a touch panel comprising a structure body comprising: a transparent substrate; a conducting pattern that is provided on at least one surface of the transparent substrate and comprises at least one selected from the group consisting of one or more metals selected from the metal group consisting of aluminum, silver, copper, molybdenum, neodymium, and nickel, an alloy of two or more metals selected from the metal group, oxide comprising one or more metals selected from the metal group, nitride comprising one or more metals selected from the metal group, and oxynitride comprising one or more metals selected from the metal group; and a light absorption pattern provided on at least one surface of the conducting pattern and provided on at least a portion of regions corresponding to the conducting pattern.

Advantageous Effects

According to exemplary embodiments of the present invention, in a touch panel comprising a conducting pattern provided in an effective picture portion, it is possible to prevent reflection by the conducting pattern without affecting conductivity of the conducting pattern by introducing a light absorption pattern in a side observed by a user, and it is possible to improve a concealment property of the conducting pattern by improving light absorptivity. In addition, it is possible to further improve a contrast property of the touch panel by introducing the light absorption pattern as described above.

DESCRIPTION OF THE DRAWINGS

FIGS. 1 to 3 illustrate a laminated structure of a substrate, a conducting layer, and a light absorption layer comprised in a structured body according to an exemplary embodiment of the present invention.

FIG. 4 illustrates a path of light on a light absorption layer comprised in a structured body according to an exemplary embodiment of the present invention.

FIG. 5 illustrates a relationship between line widths of a light absorption layer and a conducting layer in a structured body according to an exemplary embodiment of the present invention.

FIG. 6 and FIG. 7 illustrate a laminated structure in the case where the touch panel according to the exemplary embodiment of the present invention has two or more laminates.

FIG. 8 illustrates a laminate according to Experimental Example 1.

FIG. 9 illustrates a laminate for measuring reflectance according to Experimental Example 6.

FIG. 10 illustrates a laminate for measuring reflectance according to Experimental Example 7.

FIG. 11 is a graph illustrating reflectance measured in Experimental Example 1, Experimental Example 5 and Experimental Example 7.

FIG. 12 is a view illustrating a microscope reflected light measurement result of a structure body of Experimental Example 1.

FIG. 13 is a view illustrating a solar light diffraction reflection pattern result of the structure body of Experimental Example 1.

FIG. 14 is a view illustrating a microscope reflected light measurement result of a structure body of Experimental Example 5.

FIG. 15 is a view illustrating a solar light diffraction reflection pattern result of the structure body of Experimental Example 5.

FIGS. 16 to 18 are views illustrating colority and total reflectance of a light absorption layer of a structure body according to a Detailed Example of the present invention.

BEST MODE

A structure body according to an exemplary embodiment of the present invention comprises: a substrate; a conducting layer provided on at least one surface of the substrate; and a light absorption layer provided on at least one surface of the conducting layer.

In the exemplary embodiment of the present invention, the light absorption layer means a layer having light absorption, and may also be represented by a terminology such as a black layer or a dark color layer in addition to the light absorption layer.

In the structure body according to the exemplary embodiment of the present invention, a total reflectance measured in a direction of an opposite surface of a surface of the light absorption layer, which is contacted with the conducting layer, may be 15% or less, 10% or less, 5% or less, and 3% or less.

In the exemplary embodiment of the present invention, the total reflectance means reflectance of light of 550 nm that is incident at an angle of 90° on a surface to be measured after an opposite surface of the surface to be measured is treated by a black layer (perfect black).

In the structure body according to the exemplary embodiment of the present invention, the light absorption layer is provided between the conducting layer and the substrate, and the total reflectance measured in a side of the substrate may be 15% or less, 10% or less, 5% or less, and 3% or less.

In the structure body according to the exemplary embodiment of the present invention, the light absorption layer is provided on an opposite surface of a surface in which the conducting layer is contacted with the substrate, and the total reflectance measured in a side of the light absorption layer may be 15% or less, 10% or less, 5% or less, and 3% or less.

In the structure body according to the exemplary embodiment of the present invention, the total reflectance of light that is incident at an angle of 90° on a surface to be measured of the light absorption layer is measured and illustrated in FIGS. 16 to 18.

As illustrated in the following FIG. 16 and FIG. 18, in the case where the total reflectance to light of 550 nm is 15% or less, preferably 10% or less, more preferably 5% or less, and much more preferably 3% or less, it can be seen that the light absorption layer can sufficiently carry out its role.

A 20° gloss value of the structure body according to the exemplary embodiment of the present invention may be 350 or less and 300 or less. A 60° gloss value of the structure body according to the exemplary embodiment of the present invention may be 300 or less and 250 or less.

The 20° gloss value of the structure body according to the exemplary embodiment of the present invention of FIG. 16 was 76, and the 60° gloss value was 112. The 20° gloss value of the structure body according to the exemplary embodiment of the present invention of FIG. 17 was 237, and the 60° gloss value was 197. The 20° gloss value of the structure body according to the exemplary embodiment of the present invention of FIG. 18 was 10, and the 60° gloss value was 64.

An L value of a color range of the structure body according to the exemplary embodiment of the present invention may be 1 to 40 on the basis of a CIE color coordinate. In more detail, the L value of the color range of the structure body may be 30 to 40, 25 to 30, 16 to 25, 5 to 16, and 1 to 5 on the basis of a CIE color coordinate.

The L value of the color range of the light absorption layer of the structure body according to the exemplary embodiment of the present invention of the following FIG. 16 was 25 to 30 on the basis of a CIE color coordinate, and the L value of the color range of the light absorption layer of the structure body according to the exemplary embodiment of the present invention of the following FIG. 18 was 5 to 12 on the basis of the CIE color coordinate.

The structure body according to the exemplary embodiment of the present invention means a structure in which the substrate, the conducting layer, and the light absorption layer are laminated as separate layers, and a multilayered structure in which the conducting layer and the light absorption layer are sequentially deposited through a deposition process such as sputtering. The structure body according to the exemplary embodiment of the present invention may also be represented by a terminology such as a laminate and a multilayered structure body.

A touch panel according to the exemplary embodiment of the present invention comprises: a structure body comprising a substrate; a conducting layer provided on at least one surface of the substrate; and a light absorption pattern provided on at least one surface of the conducting pattern and provided on at least a portion of regions corresponding to the conducting pattern.

In the exemplary embodiment of the present invention, in the touch panel comprising the conducting pattern provided on an effective picture portion, it was found that a light reflection by the conducting pattern mainly affects visibility of the conducting pattern, and there was an effort for improving this. In detail, in a known ITO-based touch panel, because of high transmittance of the ITO, a problem due to reflectance of the conducting pattern is not largely shown, but it was found that reflectance and light absorption of the conducting pattern are important in the touch panel comprising the conducting pattern provided in the effective picture portion.

Therefore, in the exemplary embodiment of the present invention, in the touch panel, the light absorption pattern is introduced in order to improve a concealment property by decreasing reflectance of the conducting pattern. In the exemplary embodiment of the present invention, it is possible to improve the concealment property according to high reflectance of the conducting pattern by providing the light absorption pattern in a side observed by a user in the touch panel, if necessary, in both surfaces. In detail, since the light absorption pattern has light absorption, by decreasing the quantity of light that is incident on the conducting pattern and is reflected by the conducting pattern, reflectance by the conducting pattern may be decreased. It is preferable that the light absorption pattern has low reflectance as compared to the conducting pattern. Thereby, as compared to the case where the user directly observes the conducting pattern, reflectance of light may be decreased, such that visibility of the conducting pattern may be largely decreased.

In the touch panel according to the exemplary embodiment of the present invention, the light absorption pattern may be provided on a surface facing a surface on which the display module is mounted among both surfaces of the conducting pattern. The light absorption pattern may be provided on both surfaces of the conducting pattern.

It is preferable that the total reflectance of the entire surface layer formed of a material constituting the light absorption pattern and a material constituting the conducting pattern is small, and the total reflectance may be 15% or less, 10% or less, 5% or less, and 3% or less. The material having the high total reflectance, such as Ag, Au or Al, may not be suitable to the light absorption pattern according to the exemplary embodiment of the present invention. It is preferable that the total reflectance is small, but from the standpoint of selection of the material, the material in which the total reflectance of the entire surface layer is 0.1% or more may be used.

In the touch panel according to the exemplary embodiment of the present invention, the light absorption pattern comprises a first surface that is contacted with the conducting pattern and a second surface facing the first surface, and when the total reflectance of the structure body is measured in a side of the second surface of the light absorption pattern, the total reflectance (Rt) of the structure body may be calculated by the following Equation 1.

Total reflectance ($Rt$)=reflectance of touch reinforced glass (in the case where the surface is a film, reflectance of the film)+closure ratio×reflectance of the light absorption pattern [Equation 1]

In the case where two kinds of structure bodies are laminated in the constitution of the touch panel, the total reflectance (Rt) of the structure body may be calculated by the following Equation 2.

Total reflectance ($Rt$)=reflectance of touch reinforced glass (in the case where the surface is a film, reflectance of the film)+closure ratio×reflectance of the light absorption pattern×2 [Equation 2]

Therefore, a difference between the case where there is a light absorption pattern and the case where there is no light absorption pattern depends on the reflectance of the light absorption pattern, and from this standpoint of view, as compared to the total reflectance (R0) of the structure body having the same constitution except for the case without the light absorption pattern, the reflectance may be decreased by 10 to 20%, 20 to 30%, 30 to 40%, 40 to 50%, and 50 to 70%. That is, in the case where in Equations 1 and 2, when the closure ratio range is changed from 1 to 10% and the reflectance range is changed from 1 to 30%, the maximum reflectance decrease effect of 70% may be exhibited, and the minimum reflectance decrease effect of 10% may be exhibited.

In the touch panel according to the exemplary embodiment of the present invention, the light absorption pattern comprises a first surface that is contacted with the conducting pattern and a second surface that faces the first surface, and when the total reflectance of the structure body is measured in a side of the second surface of the light absorption pattern, a difference between the total reflectance (Rt) of the structure body and the total reflectance (R0) of the substrate may be 40% or less, 30% or less, 20% or less, and 10% or less.

In the touch panel according to the exemplary embodiment of the present invention, the touch panel may further comprise an additional substrate provided on one side of the structure body, and when the total reflectance of the additional substrate provided on the structure body is measured in a side of the additional substrate, a difference with the total reflectance of the additional substrate may be 90% or less, 70% or less, 30% or less, and 10% or less.

Herein, the total reflectance means total reflectance of a touch sensor comprising the light absorption pattern.

In the present specification, when the incident light is 100%, the total reflectance is preferably the measured value on the basis of the value of wavelength of 550 nm among reflected lights reflected by a target layer or a laminate on which light is incident, and this is because the total reflectance of the wavelength of 550 nm is not largely different from the entire total reflectance in general. For example, after the entire surface light absorption layer is formed by using a method for depositing a material constituting the light absorption pattern on the substrate, for example, a sputtering method, a CVD (chemical vapor deposition) method, a thermal evaporation method, and an e-beam deposition method, reflectance (550 nm) of visible rays that are incident from an air side may be measured. In this case, on the rear surface of the substrate, that is, on a surface on which the light absorption layer is not formed, reflection on the rear surface of the substrate may be removed by performing the entire surface black treatment. As the substrate, a transparent substrate may be used, but the substrate is not particularly limited, and for example, glass, a plastic substrate, and a plastic film may be used.

In the touch panel according to the exemplary embodiment of the present invention, the 20° gloss value of the structure body may be 350 or less, and 300 or less. The 60° gloss value of the structure body according to the exemplary embodiment of the present invention may be 300 or less, and 250 or less.

In the touch panel according to the exemplary embodiment of the present invention, the L value of the color range of the structure body may be 1 to 40 on the basis of the CIE color coordinate. In more detail, the L value of the color range of the structure body may be 30 to 40, 25 to 30, 16 to 25, 5 to 16, and 1 to 5 on the basis of the CIE color coordinate.

In the touch panel according to the exemplary embodiment of the present invention, a haze value of the structure body may be 5% or less, 3% or less, and 1.5% or less.

In the touch panel according to the exemplary embodiment of the present invention, the light absorption pattern may be provided between the conducting pattern and the substrate, and the light absorption pattern may be provided on an opposite surface of a side of the conducting pattern which is contacted with the substrate. The light absorption pattern may be provided between the conducting pattern and the substrate and on an opposite surface of a side of the conducting pattern which is contacted with the substrate.

The light absorptivity of the entire surface layer made of the material constituting the light absorption pattern is not particularly limited, but may be 5% or more, 15% or more, and 20% or more.

The light transmittance of the entire surface layer made of the material constituting the light absorption pattern is not particularly limited.

The light absorption pattern may be formed by forming a light absorption layer by using a deposition method, for example, a method such as a sputtering method, a CVD (chemical vapor deposition) method, a thermal evaporation method, and an e-beam deposition method, and then patterning the light absorption layer. In particular, in the case where the sputtering method is used, a flexible property of the light absorption pattern is excellent. In the thermal evaporation method and e-beam deposition method, particles are simply stacked, but the sputtering method is characterized in that particles form nucleus by collision and even though the nucleus grows and is bent, mechanical properties are excellent. In the case where the sputtering method is used, interface attachment ability between the light absorption pattern and another layer is excellent. By using the deposition method as described above, without using an adhesive layer or an attachment layer, a light absorption pattern may be directly formed on a substrate or a conducting pattern, and a desired thickness and a pattern shape may be implemented.

A touch panel according to the exemplary embodiment of the present invention may further comprise a structure body comprising: a substrate; a conducting pattern provided on at least one surface of the substrate; and a light absorption pattern provided on at least one surface of the conducting pattern and provided on regions corresponding to the conducting pattern.

Herein, an insulation layer may be provided between the two laminates. The two laminates may be disposed in an opposite direction or the same direction. On both surfaces of the substrate, the conducting pattern and the light absorption pattern may be provided.

Examples of the laminate comprised in the touch panel according to the exemplary embodiment of the present invention are illustrated in FIG. 1 to FIG. 3. FIG. 1 to FIG. 3 illustrate a laminating order of the substrate, the conducting pattern, and the light absorption pattern, and the conducting pattern and the light absorption pattern actually have a pattern shape instead of the entire surface layer.

FIG. 1 illustrates the case where the light absorption pattern is disposed between the substrate and the conducting pattern. In the case where a user observes the touch panel from a side of the substrate, the total reflectance by the conducting pattern may be largely decreased. FIG. 2 illustrates the case where the light absorption pattern is disposed on an opposite surface of a side of the conducting pattern which is contacted with the substrate. In the case where a user observes the touch panel from an opposite surface of a side of the substrate, the total reflectance by the conducting pattern may be largely decreased. FIG. 3 illustrates the case where the light absorption pattern is disposed between the substrate and the conducting pattern and on an opposite surface of a side of the conducting pattern which is contacted with the substrate. In both the case where a user observes the touch panel from a side of the substrate and the case where the user observes the touch panel from an opposite surface of a side of the substrate, the total reflectance by the conducting pattern may be largely decreased.

FIG. 4 illustrates a path of light that is incident on the light absorption pattern. A portion of light that is incident on the light absorption pattern may be reflected at the interface between the air layer and light absorption pattern, a portion of light may be absorbed into the light absorption pattern, a portion of light may be reflected at the interface between the light absorption pattern and substrate, and a portion of light may be transmitted through the light absorption pattern.

In the exemplary embodiment of the present invention, the light absorption pattern and the conducting pattern may be patterned simultaneously or separately, but layers for forming each pattern are separately formed. By forming the pattern as described above, while an effect of the light absorption layer pattern is optimized and maximized, it is possible to implement a fine conducting pattern required in an electrostatic capacitance type touch panel. In the electrostatic capacitance type touch panel, in the case where the fine conducting pattern is not implemented, physical properties required in the touch panel, such as resistance cannot be obtained.

In the exemplary embodiment of the present invention, since the light absorption pattern and the conducting pattern form a laminated structure by a separate pattern layer, the structure is different from a structure in which at least a portion of a light absorption material is recessed or dispersed in a conducting pattern, or a structure in which a portion of a surface is physically or chemically deformed by performing surface treatment on a conducting layer of a single layer.

In the touch panel according to the exemplary embodiment of the present invention, the light absorption pattern is directly provided on the substrate or the conducting pattern while an attachment layer or an adhesive layer is not disposed there between. An attachment layer or an adhesive layer may affect durability or optical properties. A method for manufacturing the laminate comprised in the touch panel according to the exemplary embodiment of the present invention is totally different from the case where an attachment layer or an adhesive layer is used. Moreover, as compared to the case where the attachment layer or adhesive layer is used, in the exemplary embodiment of the present invention, interface properties between the substrate or the conducting pattern and the light absorption pattern are excellent.

In the exemplary embodiment of the present invention, the thickness of the light absorption pattern is not particularly limited so long as the pattern has the above total reflectance. However, during the manufacturing process, in consideration of an etching property with the conducting pattern, it is preferable that the thickness is selected from 10 nm to 400 nm, but the preferable thickness may be different according to the used material and manufacturing process, and the scope of the present invention is not limited to the above numerical range.

The light absorption pattern may be formed of a single layer, or a plurality of layers of two or more layers.

It is preferable that the light absorption pattern has an achromatic color, but the color thereof is not particularly limited thereto. In this case, the achromatic color means a color exhibited when light that is incident on a surface of an object is not selectively absorbed but evenly reflected with respect to a wavelength of each component.

As the material of the light absorption pattern, preferably, a material has the above total reflectance when an entire surface layer is formed may be used while not being particularly limited. For example, in a color filter, materials used as a material of a black matrix may be used. As the material of the light absorption pattern, a light absorption material to which antireflection function is provided may be used.

For example, the light absorption pattern may be an oxide film, a nitride film, an oxynitride film, a carbide film, or a metal film and a combination thereof formed by using Ni, Mo, Ti, Cr, Al, and Cu under a deposition condition set by the person with ordinary skill in the art. The present inventors found that in the case where Mo, Al or Cu is used, as compared to the case of using the oxide, the case of using the nitride has optical properties more suitable for the light absorption pattern as described in the exemplary embodiment of the present invention.

As a detailed example thereof, the light absorption pattern may comprise Ni and Mo simultaneously. The light absorption pattern may comprise 50 to 98 atom % of Ni and 2 to 50 atom % of Mo, and may further comprise 0.01 to 10 atom % of other metals, for example, atoms such as Fe, Ta, and Ti. Herein, the light absorption pattern, if necessary, may further comprise 0.01 to 30 atom % of nitrogen or 4 atom % or less of oxygen and carbon.

As another detailed example thereof, the light absorption pattern may comprise a dielectric material selected from SiO, $SiO_2$, $MgF_2$ and SiNx (x is an integer of 1 or more) and a metal selected from Fe, Co, Ti, V, Al, Cu, Au and Ag, and may further comprise an alloy of two or more kinds of metals selected from Fe, Co, Ti, V, Al, Cu, Au and Ag. It is preferable that the dielectric material is distributed to be gradually decreased as external light is far away from an incident direction, and the metal and the alloy component are distributed on the contrary. In this case, it is preferable that the content of the dielectric material is 20 to 50 wt % and the content of the metal is 50 to 80 wt %. In the case where the light absorption pattern further comprises the alloy, it is preferable that the light absorption pattern comprises 10 to 30 wt % of the dielectric material, 50 to 80 wt % of the metal, and 5 to 40 wt % of the alloy.

As another detailed example thereof, the light absorption pattern may be formed of a thin film comprising an alloy of nickel and vanadium, and one or more oxide, nitride, and oxynitride of nickel and vanadium. In this case, it is preferable that vanadium is comprised in a content of 26 to 52 atom %, and it is preferable that an atomic ratio of vanadium to nickel is 26/74 to 52/48.

As another detailed example thereof, the light absorption pattern may comprise a transition layer in which two or more elements are comprised and a composition ratio of one element is increased by about maximum 20% per 100 angstrom according to an incident direction of external light. In this case, one element may be a metal element such as chrome, tungsten, tantalum, titanium, iron, nickel or molybdenum, and an element other than the metal element may be oxygen, nitrogen or carbon.

As another detailed example thereof, the light absorption pattern may comprise a first chrome oxide layer, a metal layer, a second chrome oxide layer, and a chrome mirror, and in this case, may comprise metal selected from tungsten, vanadium, iron, chrome, molybdenum, and niobium instead of chrome. It is preferable that the metal layer has a thickness of 10 to 30 nm, the first chrome oxide layer has a thickness of 35 to 41 nm, and the second chrome oxide layer has a thickness of 37 to 42 nm.

As another detailed example thereof, as the light absorption pattern, a laminated structure of an alumina ($Al_2O_3$) layer, a chrome oxide ($Cr_2O_3$) layer and a chrome (Cr) layer may be used. Herein, the alumina layer has improvement of a reflection characteristic and a light diffusion prevention characteristic, and the chrome oxide layer may improve a contrast characteristic by decreasing inclined surface reflectance.

As another detailed example thereof, as the light absorption pattern, a laminated structure formed of aluminum nitride (AlNx) and Al may be used. Herein, the aluminum nitride (AlNx) layer may improve a contrast characteristic by decreasing reflectance of the entire layer.

In the exemplary embodiment of the present invention, it is preferable that the light absorption pattern is provided between the substrate and the conducting pattern, but in constituting the touch panel, in the case where a user observes through another surface instead of a surface of the substrate, it is more preferable that the light absorption pattern is disposed on the closest surface to the user.

In the exemplary embodiment of the present invention, the light absorption pattern is provided in a region corresponding to the conducting pattern. Herein, the region corresponding to the conducting pattern means that the region has the pattern having the same shape as the conducting pattern. However, the pattern size of the light absorption pattern does not need to be completely identical to the conducting pattern, and the case where the line width of the light absorption pattern is narrower or wider than the line width of the conducting pattern is also comprised in the scope of the present invention. For example, it is preferable that the light absorption pattern has an area of 50 to 150% of an area in which the conducting pattern is provided.

It is preferable that the light absorption pattern has a pattern shape having the line width equal to or larger than the line width of the conducting pattern.

In the case where the light absorption pattern has the pattern shape having the larger line width than the conducting pattern, when the user observes the pattern, an effect in which the light absorption pattern covers the conducting pattern may be increased, such that there is an advantage in that an effect by gloss or reflection of the conducting pattern may be efficiently blocked. However, even though the line width of the light absorption pattern is the same as the line width of the conducting pattern, a target effect of the present invention can be accomplished. It is preferable that the line width of the light absorption pattern is larger than the line width of the conducting pattern by a value according to the following Equation 3.

$$Tcon \times \tangent \Theta_3 \times 2 \qquad \text{[Equation 3]}$$

wherein

Tcon is the thickness of the conducting pattern, and $\Theta_3$ is an angle between light and a tangential line with respect to the surface of the substrate when light that is incident from a position of the vision of the user of the touch panel passes through the corners of the conducting pattern and the light absorption pattern.

For example, in the laminated structure like FIG. 1, a calculation equation by Equation 3 is illustrated in FIG. 5. $\Theta_3$ is an angle obtained by modifying an angle ($\Theta_1$) between the vision of the user of the touch panel and the substrate by a refractive index of the substrate and a refractive index of a medium of a region in which the light absorption pattern and the conducting pattern are disposed, for example, an adhesive of the touch panel according to the Snell's law.

As an example thereof, assuming that an observer observes the laminate so that a value of $\Theta_3$ is an angle of about 80° and the thickness of the conducting pattern is about 200 nm, it is preferable that the line width of the light absorption pattern is larger than that of the conducting pattern by about 2.24 μm (200 nm×tan(80)×2) on the basis of a lateral surface. However, as described above, even though the line width of the light absorption pattern is the same as that of the conducting pattern, a target effect of the present invention can be accomplished. In order to form the structure of the light absorption layer and the conducting layer as described above, different etching conditions or deposition thicknesses may be applied by the person with ordinary skill in the art.

In the exemplary embodiment of the present invention, the material of the substrate may be appropriately selected according to the field to which the laminate according to the exemplary embodiment of the present invention is applied, and as preferable examples thereof, there are a glass or an inorganic material substrate, a plastic substrate or a film, but the material is not limited thereto.

The material of the conducting pattern is not particularly limited, but is preferably metal. It is preferable that the material of the conducting pattern has excellent conductivity and can be easily etched. However, in general, the material having excellent conductivity has a disadvantage in that reflectance is high. However, in the exemplary embodiment of the present invention, because the light absorption pattern is used, it is possible to form the conducting pattern by using the material having the high reflectance. In the exemplary embodiment of the present invention, even though the material having the total reflectance of 70 to 80% or more is used, it is possible to decrease the reflectance through the light absorption pattern, decrease visibility of the conducting pattern, and maintain or improve a contrast characteristic.

As a detailed example of the material of the conductive pattern, a single film or a multilayered film comprising gold, silver, aluminum, copper, neodymium, molybdenum, nickel, or an alloy thereof is preferable. Herein, the thickness of the conductive pattern is not particularly limited, but is preferably 0.01 to 10 μm in terms of the conductivity of the conductive pattern and the economic efficiency of the forming process thereof.

According to the exemplary embodiment of the present invention, a specific resistance value measured while a laminate material formed of the material of the light absorption layer and the material of the conducting layer is considered as one material is preferably $1 \times 10^6$ ohm·cm to $30 \times 10^6$ ohm·cm, and more preferably $7 \times 10^6$ ohm·cm or less.

The method for forming the conducting pattern is not particularly limited, and the conducting pattern may be formed by using a direct printing method, or a method for patterning a conducting layer after forming the conducting layer may be used.

In the case where the conducting pattern is formed by using the printing method, ink or paste of the conducting material may be used, and the paste may further comprise a binder resin, a solvent or a glass frit in addition to the conducting material.

In the case where a conducting layer is formed, and then the layer is patterned, a material having an etching resist characteristic may be used.

The conducting layer may be formed by a method such as deposition, sputtering, wet coating, evaporation, electrolytic plating or electroless plating, and lamination of a metal foil. As the method for forming the conducting layer, a method in which organic metal, nano metal or a complex solution thereof is coated on the substrate, and then conductivity is provided by firing and/or drying may be used. As the organic metal, organic silver may be used, and as the nanometal, nanosilver particles may be used.

The patterning of the conducting layer may use a method using an etching resist pattern. The etching resist pattern may be formed by using a printing method, a photolithography method, a photography method, a method using a mask, or a laser transferring, for example, a thermal transfer imaging, and the printing method or the photolithography method is more preferable. The conducting pattern may be etched by using the etching resist pattern and the etching resist pattern may be removed.

In the exemplary embodiment of the present invention, the line width of the conducting pattern may be 10 μm or less, preferably 0.1 to 10 μm, more preferably 0.2 to 8 μm, and much more preferably 5 μm or less. The thickness of the conducting pattern may be 10 μm or less, preferably 2 μm or less, and more preferably 10 to 300 nm.

It is preferable that an opening ratio of the conducting pattern is 85% to 99.5%.

The conducting pattern may be a regular pattern or an irregular pattern.

As the regular pattern, a pattern shape of the art such as a mesh pattern may be used. The irregular pattern is not particularly limited, but may be a boundary line shape of figures constituting a Voronoi diagram. In the exemplary embodiment of the present invention, in the case where the irregular pattern and the light absorption pattern are used together, a diffracted pattern of reflected light by lighting having a directivity may be removed by the irregular pattern, and an influence by scattering of light may be minimized by the light absorption pattern, such that the problem in visibility may be minimized.

The pitch of the conducting pattern is preferably 600 μm or less and more preferably 270 μm or less, but this may be controlled by the person with ordinary skill in the art according to the desired transmittance and conductivity.

In the exemplary embodiment of the present invention, it is preferable that the surface resistance of the structure body comprising the substrate, the conducting pattern, and the light absorption pattern is 1 to 250 ohm/square. The surface resistance within the above range is advantageous in operating a touch panel.

In the exemplary embodiment of the present invention, lateral surfaces of the light absorption pattern and the conducting pattern may have a positive taper angle, but the light absorption pattern or conducting pattern disposed on an opposite surface of the side of the conducting pattern which is contacted with the substrate may have a negative taper angle.

The touch panel according to the exemplary embodiment of the present invention may further comprise an additional structure body in addition to the above-mentioned structure body that comprises the substrate, the conducting pattern, and the light absorption pattern. In this case, as shown in FIG. 6, two structure bodies may be disposed in the same direction, and as shown in FIG. 7, two structure bodies may be disposed in an opposite direction. FIG. 6 and FIG. 7 illustrate the case where two structure bodies having the same structure are comprised, but the structure body comprised in the touch panel according to the exemplary embodiment of the present invention does not need to have the same structure, and any one, preferably, only the structure body that is the closest to the user may comprise the substrate, the conducting pattern, and the light absorption pattern, and an additionally comprised structure body may not comprise the light absorption pattern. Layer laminate structures in two or more structure bodies may be different from each other. In the case where two or more structure bodies are comprised, an insulation layer may be provided therebetween. In this case, the insulation layer may further have a function of an adhesive layer.

In the touch panel according to the exemplary embodiment of the present invention, the conducting pattern and the light absorption pattern may be provided on both surfaces of the substrate, respectively.

The total reflectance of the touch panel constituted by the structure body that comprises the conducting pattern and the light absorption pattern according to the exemplary embodiment of the present invention may be 10% or less, 7% or less, 5% or less, and 2% or less.

Herein, the total reflectance of the touch panel means total reflectance of light that is incident from a side on which the light absorption pattern is provided, and is a value excluding the reflectance at an interface between the substrate and an air layer. Through controlling of reflectance by selection of the material constituting the light absorption pattern and controlling of the reflectance at an interface between the conducting pattern and the light absorption pattern, the thickness of the conducting pattern, and the shape of the pattern, the total reflectance of the entire structure body may be further controlled.

The touch panel according to the exemplary embodiment of the present invention may further comprise an electrode portion or a pad portion in addition to an effective picture portion on which the conducting pattern is formed on the structure body, and in this case, the effective picture portion and the electrode portion/pad portion may be constituted by the same conductor.

The touch panel according to the exemplary embodiment of the present invention may further comprise one or more films such as a protective film, a polarizing film, an antireflection film, an antiglaring film, a fingerprint-resistant film, and a low reflection film.

The present invention provides a method for manufacturing a touch panel.

According to an exemplary embodiment of the present invention, the present invention provides a method for manufacturing a touch panel, comprising: forming a conducting pattern on a substrate; and forming a light absorption pattern before, after, and before and after the conducting pattern is formed.

According to another exemplary embodiment of the present invention, there is provided a method for manufacturing an electrostatic capacitance type touch panel, comprising: forming a conducting layer for forming a conducting pattern on a substrate; depositing a light absorption layer for forming a light absorption pattern before, after, and before and after the conducting layer is formed; and separately or simultaneously patterning the conducting layer and the light absorption layer.

In the manufacturing method, the material and forming method of the above each layer may be used.

A structure body according to the exemplary embodiment of the present invention comprises a transparent substrate; a conducting layer provided on at least one surface of the transparent substrate and comprising at least one of metal, an alloy of metals, metal oxide, metal nitride, and metal oxynitride; and a light absorption layer provided on at least one surface of the conducting layer, wherein the light absorption layer is provided between the conducting layer and the transparent substrate, and total reflectance measured in a side of the transparent substrate is 15% or less.

A touch panel according to the exemplary embodiment of the present invention comprises a structure body comprising: a transparent substrate; a conducting pattern that is provided on at least one surface of the transparent substrate and comprises at least one selected from the group consisting of one or more metals selected from the metal group consisting of aluminum, silver, copper, molybdenum, neodymium, and nickel, an alloy of two or more metals selected from the metal group, oxide comprising one or more metals selected from the metal group, nitride comprising one or more metals selected from the metal group, and oxynitride comprising one or more metals selected from the metal group; and a light absorption pattern provided on at least one surface of the conducting pattern and provided on at least a portion of regions corresponding to the conducting pattern.

The present invention provides a display comprising the touch panel and a display module.

MODE FOR INVENTION

Hereinafter, the present invention will be described in detail with reference to the Examples. However, the following Examples are set forth to illustrate the present invention, but the scope of the present invention is not limited thereto.

Experimental Example 1

After the light absorption layer formed by using the Mo-based oxynitride was formed on the substrate, the conducting layer was formed thereon by using Cu. Subsequently, in order to measure the total reflectance, the entire surface black treatment was performed on the upper surface of the conducting layer, and the total reflectance (specular reflection/550 nm) was measured by irradiating visible rays from the substrate. In this case, the reflectance was 6.1%. The laminate according to Experimental Example 1 was illustrated in FIG. 8.

Experimental Example 2

After the light absorption layer formed by using the Al-based oxynitride was formed on the substrate, the conducting layer was formed thereon by using Al. Subsequently, in order to measure the total reflectance, the entire surface black treatment was performed on the upper surface of the conducting layer, and the total reflectance (specular reflection/550 nm) was measured by irradiating visible rays from the substrate. In this case, the reflectance was 2.1%.

Experimental Example 3

After the light absorption layer formed by using the Cu-based oxynitride was formed on the substrate, the conducting layer was formed thereon by using Cu. Subsequently, in order to measure the total reflectance, the entire surface black treatment was performed on the upper surface of the conducting layer, and the total reflectance (specular reflection/550 nm) was measured by irradiating visible rays from the substrate. In this case, the reflectance was 6%.

Experimental Example 4

After the light absorption layer formed by using the Al-based oxynitride was formed on the substrate, the conducting layer was formed thereon by using Cu. Subsequently, in order to measure the total reflectance, the entire surface black treatment was performed on the upper surface of the conducting layer, and the total reflectance (specular reflection/550 nm) was measured by irradiating visible rays from the substrate. In this case, the reflectance was 3.1%.

Experimental Example 5

The same process as Experimental Example 1 was performed, except that the light absorption layer was not formed. In this case, the entire surface black treatment was performed on the back surface of the substrate, and the total reflectance (specular reflection/550 nm) was measured by irradiating visible rays into a side of the conducting layer. In this case, the reflectance was 49.9%.

Experimental Example 6

In the structure body manufactured like Experimental Example 1, the total reflectance in the case where the user observed not a side of the light absorption layer but a side of the conducting layer was measured. To this end, the entire surface black treatment was performed on the back surface of the substrate, and the total reflectance (specular reflection/550 nm) was measured by irradiating visible rays into a side of the conducting layer. In this case, the reflectance was 49.9%. The method for measuring the total reflectance according to Experimental Example 6 was illustrated in FIG. 9.

Experimental Example 7

The total reflectance of only the same substrate as used in Experimental Example 1 was measured. The total reflectance (specular reflection/550 nm) of only the substrate was measured by performing the entire surface black treatment on one surface of the substrate and irradiating the visible rays into the opposite surface. The total reflectance of only the substrate was 4.5%. The method for measuring the reflectance according to Experimental Example 7 was illustrated in FIG. 10.

The total reflectance of the structure body manufactured in Experimental Example 1, Experimental Example 5, and Experimental Example 7 was illustrated in FIG. 11.

As described above, in the exemplary embodiment of the present invention, in a touch panel comprising a conducting pattern provided in an effective picture portion, it is possible to prevent reflection due to the conducting pattern without affecting conductivity of the conducting pattern by introducing a light absorption pattern in a side observed by a user, and it is possible to improve a concealment property of the conducting pattern by improving light absorptivity. In addition, it is possible to further improve a contrast property of the touch panel by introducing the light absorption pattern as described above.

The microscope reflected light measurement result of the structure body of Experimental Example 1 was illustrated in the following FIG. 12, and the solar light diffraction reflection pattern was observed and illustrated in the following FIG. 13. The microscope reflected light measurement result of the structure body of Experimental Example 5 was illustrated in the following FIG. 14, and the solar light diffraction reflection pattern was observed and illustrated in the following FIG. 15.

The colority and total reflectance of the light absorption layer of the structure body of Experimental Example 2 were illustrated in the following FIG. 18, and the colority and total reflectance of the light absorption layer of the structure body of Experimental Example 3 were illustrated in the following FIG. 16. The colority and total reflectance of the light absorption layer of the structure body of Experimental Example 4 were similar to those of the following FIG. 18.

As shown in the results of the following FIGS. 12 to 18, it can be seen that when the touch panel comprising the light absorption pattern as in the exemplary embodiment of the present invention is measured in a reflection mode through a microscope, the line may be seen in a dark color by the light absorption pattern and, in a reflection image of a dot light source, the intensity of diffracted light is further weakened.

The invention claimed is:

1. A structure body comprising:
a substrate;
a conducting layer comprising Cu provided on at least one side of the substrate; and
a light absorption layer provided on at least one surface of the conducting layer,
wherein the light absorption layer comprises a Cu oxynitride,
wherein a total reflectance measured in a direction of an opposite surface of a surface of the light absorption layer, which is contacted with the conducting layer, is 15% or less.

2. The structure body according to claim 1, wherein the light absorption layer is provided between the conducting layer and the substrate, and a total reflectance measured in a side of the substrate is 15% or less.

3. The structure body according to claim 1, wherein the light absorption layer is provided on an opposite surface of a surface in which the conducting layer is contacted with the substrate, and a total reflectance measured in a side of the light absorption layer is 15% or less.

4. The structure body according to claim 1, wherein a 20° gloss value of the structure body is 350 or less.

5. The structure body according to claim 1, wherein a 60° gloss value of the structure body is 300 or less.

6. A touch panel comprising:
a structure body comprising:
a substrate;
a conducting pattern comprising Cu provided on at least one side of the substrate; and
a light absorption pattern provided on at least one surface of the conducting pattern and provided on at least a portion of regions corresponding to the conducting pattern,
wherein the light absorption pattern comprises Cu oxynitride;
wherein a total reflectance measured in a direction of an opposite surface of a surface of the light absorption layer, which is contacted with the conducting layer, is 15% or less.

7. The touch panel according to claim 6, wherein the light absorption pattern is provided on an opposite surface of a surface of the conducting pattern on which a display module is mounted.

8. The touch panel according to claim 6, wherein the light absorption pattern is provided on both surfaces of the conducting pattern.

9. The touch panel according to claim 6, wherein the light absorption pattern comprises a first surface that is contacted with the conducting pattern and a second surface that faces the first surface, and when a total reflectance of the structure body is measured in a side of the second surface of the light absorption pattern, the total reflectance (Rt) of the structure body is decreased by 10 to 20% as compared to the total reflectance (R0) of the structure body that has the same constitution with the exception of the no light absorption pattern.

10. The touch panel according to claim 6, wherein the light absorption pattern comprises a first surface that is contacted with the conducting pattern and a second surface that faces the first surface, and when a total reflectance of the structure body is measured in a side of the second surface of the light absorption pattern, the total reflectance (Rt) of the structure body is decreased by 20 to 30% as compared to the total reflectance (R0) of the structure body that has the same constitution with the exception of the no light absorption pattern.

11. The touch panel according to claim 6, wherein the light absorption pattern comprises a first surface that is contacted with the conducting pattern and a second surface that faces the first surface, and when a total reflectance of the structure body is measured in a side of the second surface of the light absorption pattern, the total reflectance (Rt) of the structure body is decreased by 30 to 40% as compared to the total reflectance (R0) of the structure body that has the same constitution with the exception of the no light absorption pattern.

12. The touch panel according to claim 6, wherein the light absorption pattern comprises a first surface that is contacted with the conducting pattern and a second surface that faces the first surface, and when a total reflectance of the structure body is measured in a side of the second surface of the light absorption pattern, the total reflectance (Rt) of the structure body is decreased by 40 to 50% as compared to the total reflectance (R0) of the structure body that has the same constitution with the exception of the no light absorption pattern.

13. The touch panel according to claim 6, wherein the light absorption pattern comprises a first surface that is contacted with the conducting pattern and a second surface that faces the first surface, and when a total reflectance of the structure body is measured in a side of the second surface of the light absorption pattern, the total reflectance (Rt) of the structure body is decreased by 50 to 70% as compared to the total reflectance (R0) of the structure body that has the same constitution with the exception of the no light absorption pattern.

14. The touch panel according to claim 6, wherein the light absorption pattern comprises a first surface that is contacted with the conducting pattern and a second surface that faces the first surface, and when a total reflectance of the structure body is measured in a side of the second surface of the light absorption pattern, a difference between the total reflectance (Rt) of the structure body and the total reflectance (R0) of the substrate is 40% or less.

15. The touch panel according to claim 6, wherein the touch panel further comprises an additional substrate provided on one side of the structure body, and when a total reflectance of the additional substrate provided in the structure body is measured in a side of the additional substrate, a difference between the total reflectance of the structure body and the total reflectance of the additional substrate is 90% or less.

16. The touch panel according to claim 6, wherein a haze value of the structure body is 5% or less.

17. The touch panel according to claim 6, wherein the light absorption pattern is provided between the conducting pattern and the substrate.

18. The touch panel according to claim 6, wherein the light absorption pattern is provided on an opposite surface of a side of the conducting pattern which is contacted with the substrate.

19. The touch panel according to claim 6, wherein the light absorption pattern is provided between the conducting pattern and the substrate, and on an opposite surface of a side of the conducting pattern which is contacted with the substrate.

20. The touch panel according to claim 6, further comprising:
a laminate comprising:
a substrate;
a conducting pattern provided on at least one side of the substrate; and
a light absorption pattern provided on at least one surface of the conducting pattern and provided on a region corresponding to the conducting pattern.

21. The touch panel according to claim 6, wherein the conducting pattern and the light absorption pattern are provided on both surfaces of the substrate, respectively.

22. The touch panel according to claim 6, wherein the light absorption pattern has a pattern shape having the same line width or larger line width than the line width of the conducting pattern.

23. The touch panel according to claim 6, wherein the line width of the conducting pattern is 10 μm or less, a thickness thereof is 2 μm or less, and a pitch thereof is 600 μm or less.

24. The touch panel according to claim 6, wherein the light absorption pattern and the conducting pattern are formed by a deposition method.

25. The touch panel according to claim 6, wherein in the conducting pattern of the structure body, a surface resistance of the electrically connected conducting pattern is 0.5 to 200 ohm/square.

26. A display comprising:
the touch panel according to claim 6, and
a display module.

27. A The touch panel according to claim 6, wherein the substrate is transparent.

28. A structure body comprising:
a transparent substrate;
a conducting layer comprising Cu provided on at least one side of the transparent substrate; and
a light absorption layer provided on at least one surface of the conducting layer,
wherein the light absorption layer is provided between the conducting layer and the transparent substrate, and a total reflectance measured in a side of the transparent substrate is 15% or less,
wherein the light absorption layer comprises Cu oxynitride.

* * * * *